United States Patent
Grammel et al.

(10) Patent No.: US 12,375,276 B2
(45) Date of Patent: Jul. 29, 2025

(54) PROVIDING QUANTUM KEY DISTRIBUTION KEY DELIVERY PROOF OF ORIGIN AND TRANSIT

(71) Applicant: Juniper Networks, Inc., Sunnyvale, CA (US)

(72) Inventors: Gert Grammel, Ditzingen (DE); Jason R. Pascucci, Milford, MA (US); Melchior Dirk Frederik Aelmans, Voorschoten (NL); Sabyasachi Mukhopadhyay, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 246 days.

(21) Appl. No.: 18/314,543

(22) Filed: May 9, 2023

(65) Prior Publication Data
US 2024/0380587 A1   Nov. 14, 2024

(51) Int. Cl.
*H04L 9/30* (2006.01)
*H04L 9/08* (2006.01)

(52) U.S. Cl.
CPC ............ *H04L 9/3026* (2013.01); *H04L 9/085* (2013.01); *H04L 9/0852* (2013.01)

(58) Field of Classification Search
None
See application file for complete search history.

(56) References Cited

U.S. PATENT DOCUMENTS

| | | | |
|---|---|---|---|
| 11,082,406 B2* | 8/2021 | Tzur-David | H04L 9/0827 |
| 2016/0315921 A1* | 10/2016 | Dara | H04L 69/166 |
| 2018/0241548 A1* | 8/2018 | Dolev | H04L 9/0656 |
| 2019/0260667 A1* | 8/2019 | Aguado | H04L 9/0825 |

OTHER PUBLICATIONS

Aguado, A., et al., "Quantum Cryptography Networks in Support of Path Verification in Service Function Chains," Journal of Optical Communications and Networking, Apr. 2020, vol. 12(4), 11 Pages.
Extended European Search Report for Application No. EP23183137. 1, mailed Nov. 24, 2023, 10 Pages.
Brockners et al., "Proof of Transit draft-ietf-sfc-proof-of-transit-08," JPMC, Oct. 31, 2020, 28 Pages.

(Continued)

*Primary Examiner* — William J. Goodchild
(74) *Attorney, Agent, or Firm* — Harrity & Harrity, LLP

(57) ABSTRACT

A device may generate a first polynomial and a second polynomial, and may generate, based on the first polynomial, a primary path from a first network device to a second network device via a first set of intermediate network devices. The device may generate, based on the second polynomial, a secondary path from the first network device to the second network device via a second set of intermediate network devices, and may assign a point of the first and second polynomials to the device, to each of the first set of intermediate network devices and of the second set of intermediate network devices. The device may cause the primary path to be provided from the first network device to the second network device, and may cause the secondary path to be provided from the first network device to the second network device.

20 Claims, 12 Drawing Sheets

(56) References Cited

OTHER PUBLICATIONS

Thakallapelli A., et al., "Real-time Frequency Based Reduced Order Modeling of Large Power Grid," 2016 IEEE Power and Energy Society General Meeting (PESGM), 5 Pages, Retrieved from the Internet: [URL:https://ieeexplore.ieee.org/document/7741877].

"Quantum Key Distribution (QKD); Protocol and data format of REST-based key delivery API," Website: https://www.etsi.org/deliver/etsi_gs/QKD/001_099/014/01.01.01_60/gs_qkd014v010101p.pdf, Feb. 2019, 22 Pages.

"Quantum Key Distribution (QKD); Control Interface for Software Defined Networks," Websiter: https://www.etsi.org/deliver/etsi_gs/QKD/001_099/015/01.01.01_60/gs_QKD015v010101p.pdf, Mar. 2021, 38 Pages.

* cited by examiner

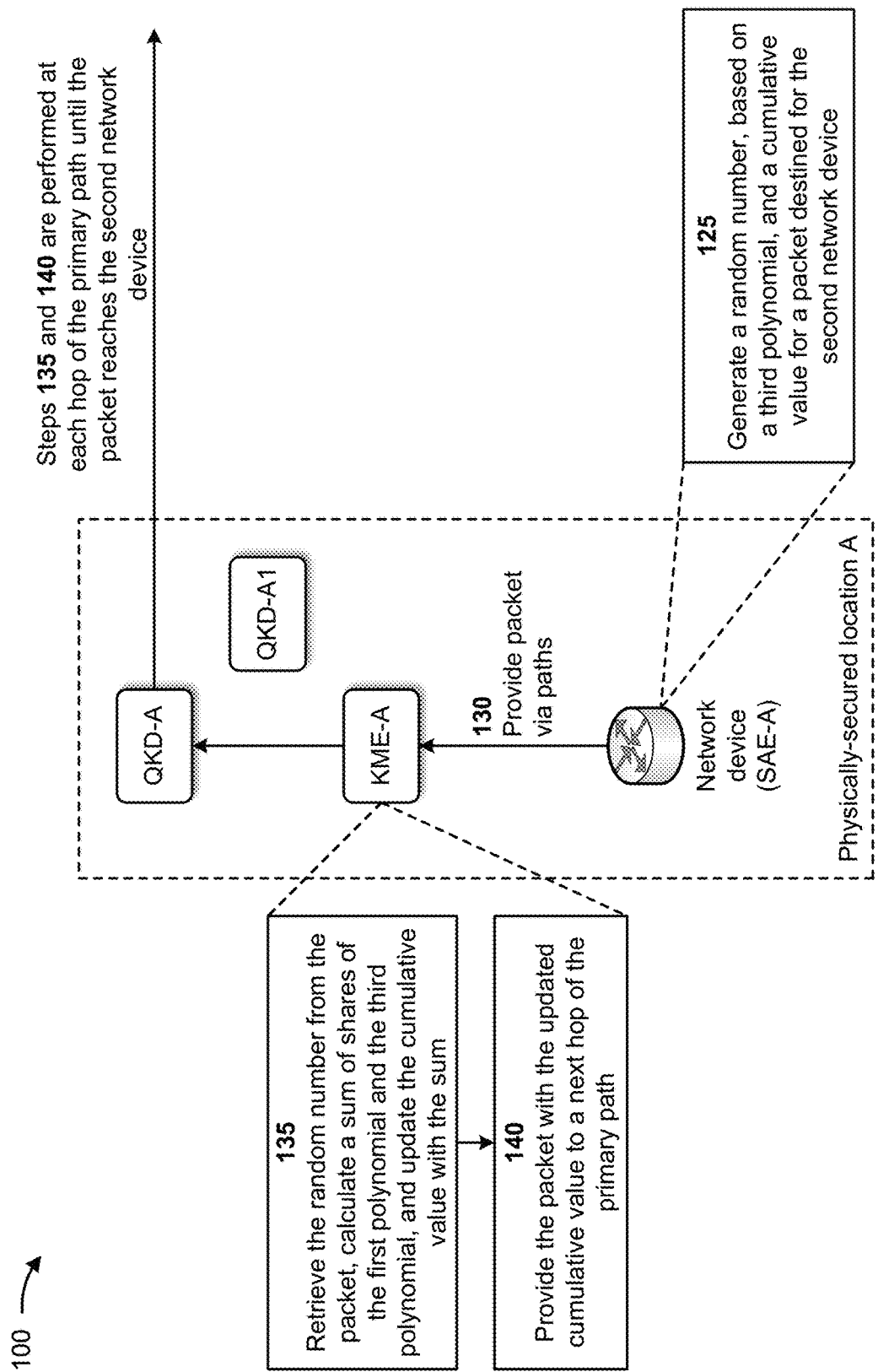

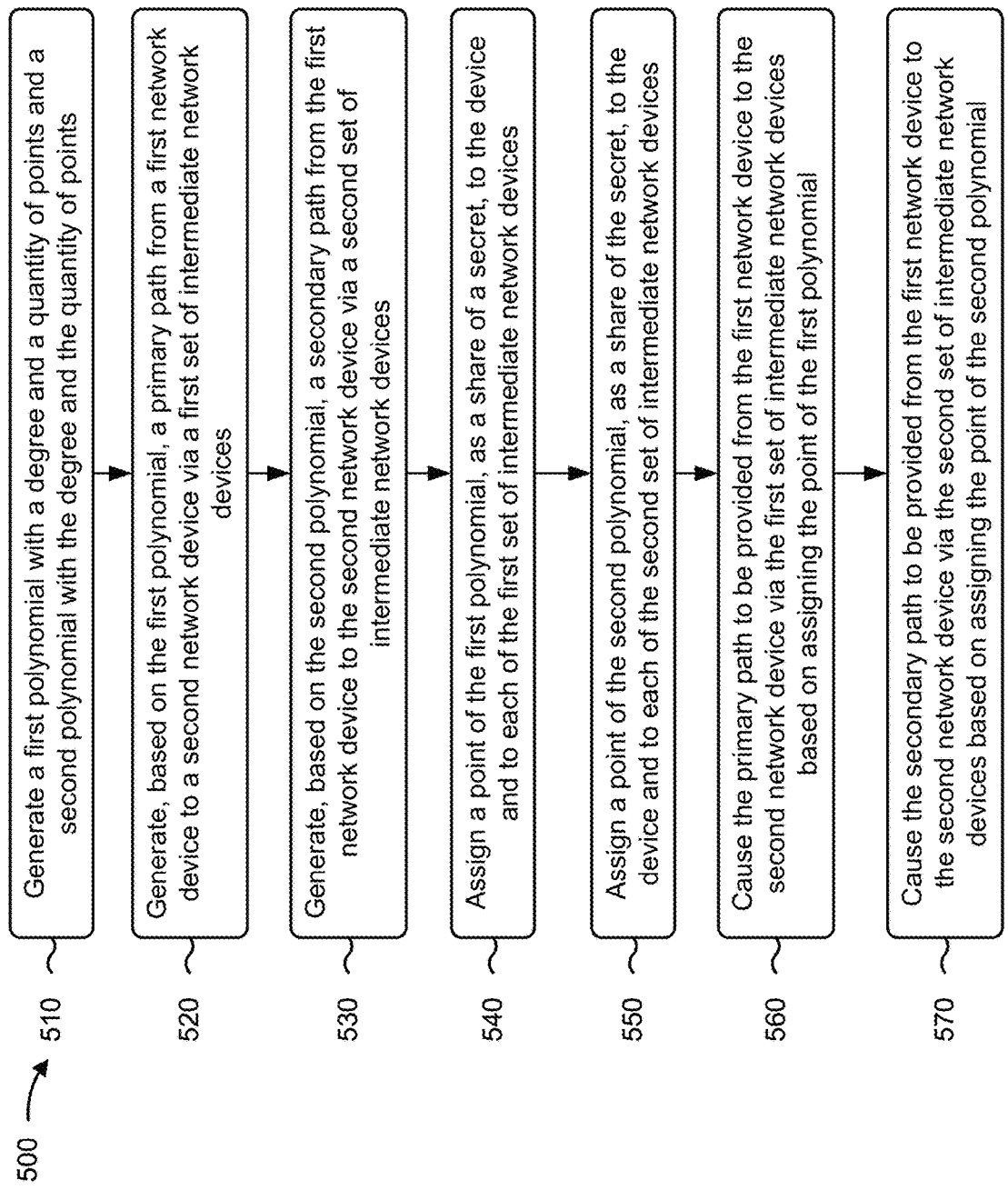

PROVIDING QUANTUM KEY DISTRIBUTION KEY DELIVERY PROOF OF ORIGIN AND TRANSIT

BACKGROUND

Quantum key distribution (QKD) is a method to determine a same random number (e.g., a secure key) at two ends of a quantum link that is considered information secure since the secure key is never transmitted over the quantum link.

SUMMARY

Some implementations described herein relate to a method. The method may include generating a first polynomial with a degree and a quantity of points and a second polynomial with the degree and the quantity of points, and generating, based on the first polynomial, a primary path from a first network device to a second network device via a first set of intermediate network devices. The method may include generating, based on the second polynomial, a secondary path from the first network device to the second network device via a second set of intermediate network devices, and assigning a point of the first polynomial, as a share of a secret, to a device and to each of the first set of intermediate network devices. The method may include assigning a point of the second polynomial, as a share of the secret, to the device and to each of the second set of intermediate network devices, and causing the primary path to be provided from the first network device to the second network device via the first set of intermediate network devices based on assigning the point of the first polynomial. The method may include causing the secondary path to be provided from the first network device to the second network device via the second set of intermediate network devices based on assigning the point of the second polynomial.

Some implementations described herein relate to a device. The device may include one or more memories and one or more processors. The one or more processors may be configured to generate a first polynomial with a degree and a quantity of points and a second polynomial with the degree and the quantity of points, and generate, based on the first polynomial, a primary path from a first network device to a second network device via a first set of intermediate network devices. The one or more processors may be configured to generate, based on the second polynomial, a secondary path from the first network device to the second network device via a second set of intermediate network devices, where the first network device is configured to provide a packet to the second network device via the primary path and via the secondary path. The one or more processors may be configured to assign a point of the first polynomial, as a share of a secret, to the device and to each of the first set of intermediate network devices, and assign a point of the second polynomial, as a share of the secret, to the device and to each of the second set of intermediate network devices. The one or more processors may be configured to cause the primary path to be provided from the first network device to the second network device via the first set of intermediate network devices based on assigning the point of the first polynomial, and cause the secondary path to be provided from the first network device to the second network device via the second set of intermediate network devices based on assigning the point of the second polynomial.

Some implementations described herein relate to a non-transitory computer-readable medium that stores a set of instructions. The set of instructions, when executed by one or more processors of a device, may cause the device to generate a first polynomial with a degree and a quantity of points and a second polynomial with the degree and the quantity of points, and generate, based on the first polynomial, a primary path from a first network device to a second network device via a first set of intermediate network devices. The set of instructions, when executed by one or more processors of the device, may cause the device to generate, based on the second polynomial, a secondary path from the first network device to the second network device via a second set of intermediate network devices, where the primary path is associated with a first quantum link and the secondary path is associated with a second quantum link. The set of instructions, when executed by one or more processors of the device, may cause the device to assign a point of the first polynomial, as a share of a secret, to the device and to each of the first set of intermediate network devices, and assign a point of the second polynomial, as a share of the secret, to the device and to each of the second set of intermediate network devices. The set of instructions, when executed by one or more processors of the device, may cause the device to cause the primary path to be provided from the first network device to the second network device via the first set of intermediate network devices based on assigning the point of the first polynomial. The set of instructions, when executed by one or more processors of the device, may cause the device to cause the secondary path to be provided from the first network device to the second network device via the second set of intermediate network devices based on assigning the point of the second polynomial.

BRIEF DESCRIPTION OF THE DRAWINGS

FIGS. 1A-1H are diagrams of an example associated with providing QKD key delivery proof of origin and transit.

FIG. 5 is a flowchart of an example process for providing QKD key delivery proof of origin and transit.

DETAILED DESCRIPTION

Figure 1A:
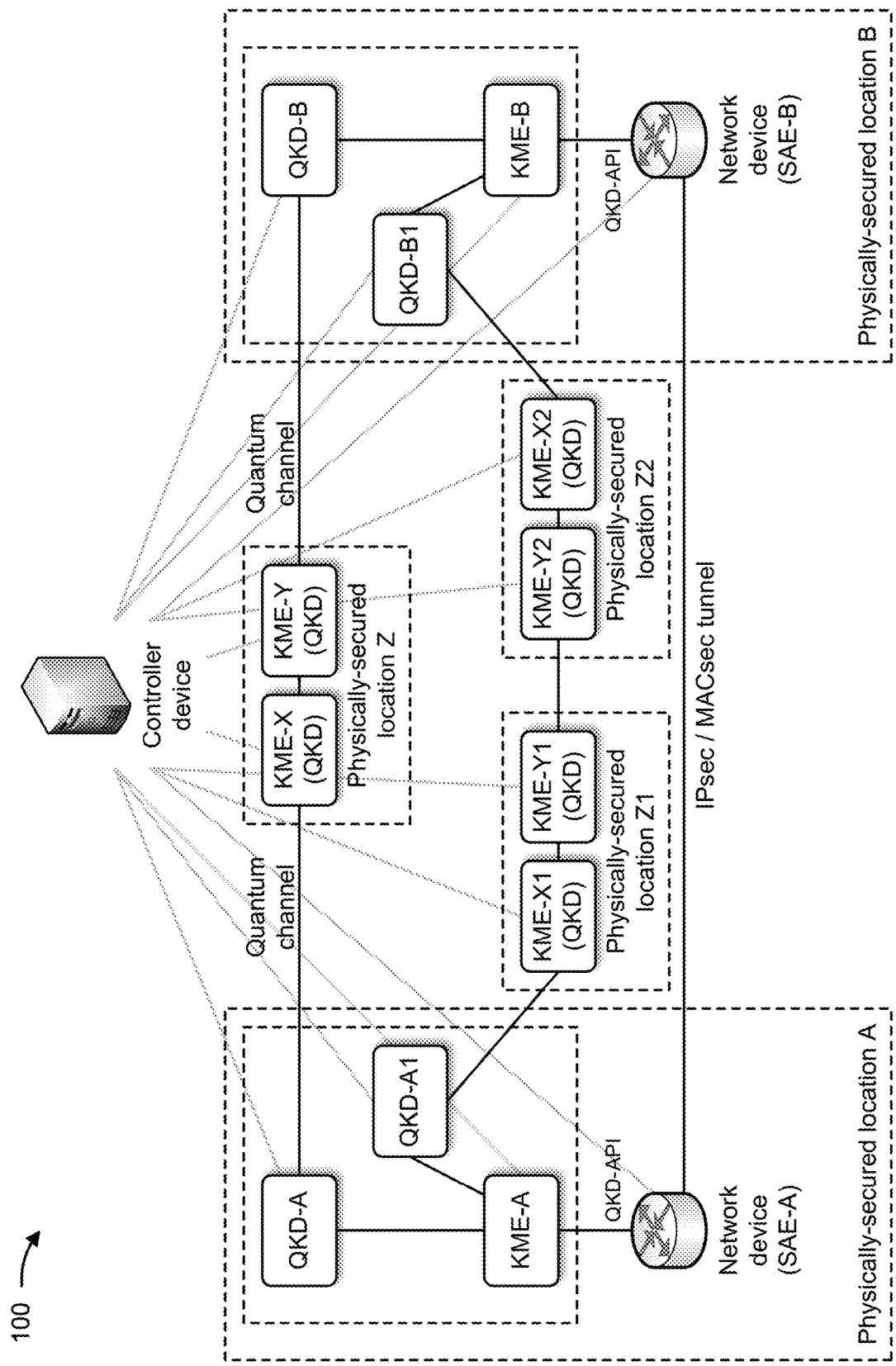

The following detailed description of example implementations refers to the accompanying drawings. The same reference numbers in different drawings may identify the same or similar elements.

Once determined, a secure key may be available at a key management entity (KME) at each end point (e.g., A and B) of a quantum link. To identify a key pair (e.g., two independent instances of the same secure key created by different entities), a unique identifier is assigned to secure keys and shared among the KMEs. Current standards define an application programming interface (API) that is used by secure application entities, such as network devices with secure tunnel terminations (e.g., secure Internet protocol (IPsec), secure media access control (MACsec), and/or the like), to retrieve the secure key and implement an encryption engine with the secure key to establish a secure tunnel.

The distance covered by a quantum link is limited by link fiber attenuation and cannot be extended using optical amplifiers. One way to extend the distance of a quantum link is to provide trusted nodes that extract key information from one side and forward the key information to another side via a secure key relay mode. Trusted nodes may have access to the secure key and need to be secured against manipulation and spoofing. According to current standards, each of the two secure application entities consuming keys (e.g., to perform IPsec or MACsec symmetric encryption) may accept any key from an associated KME. Each of the secure application entities may authenticate a key with an associated KME, but have no visibility with intermediate nodes (e.g., the trusted nodes) involved in the key distribution and are unable to validate that the two secure keys are created by different KMEs.

Misconfiguring a key delivery scheme between KMEs may cause both secure application entities to receive the exact same instance of the secure key rather than two different instances of the secure key, thereby increasing the chances of a successful attack on the quantum link. Furthermore, when an intrusion is detected at one of the trusted nodes, a secure key associated with an affected trusted node cannot be easily identified and revoked, because the secure key has already been delivered. Thus, current techniques for performing quantum key distribution consume computing resources (e.g., processing resources, memory resources, communication resources, and/or the like), networking resources, and/or the like, associated with failing to validate two secure keys that are created by different KMEs, handling network outages caused by a successful attack of a quantum link, handling lost traffic caused by a successful attack of a quantum link, failing to identify and revoke a secure key associated with a compromised trusted node, and/or the like.

Some implementations described herein relate to a controller device (e.g., of a key management network) that provides QKD key delivery proof of origin and transit. For example, a controller device may generate a first polynomial with a degree and a quantity of points and a second polynomial with the degree and the quantity of points, and may generate, based on the first polynomial, a primary path from a first network device to a second network device via a first set of intermediate network devices. The controller device may generate, based on the second polynomial, a secondary path from the first network device to the second network device via a second set of intermediate network devices, and may assign a point of the first polynomial, as a share of a secret, to the controller device, to each of the first set of intermediate network devices. The controller device may assign a point of the second polynomial, as a share of the secret, to the device and to each of the second set of intermediate network devices, and may cause the primary path to be provided from the first network device to the second network device via the first set of intermediate network devices based on assigning the point of the first polynomial. The controller device may cause the secondary path to be provided from the first network device to the second network device via the second set of intermediate network devices based on assigning the point of the second polynomial.

In this way, the controller device provides QKD key delivery proof of origin and transit. For example, the controller device may validate or prove properties and provenance, including trusted nodes, for a quantum link. The controller device may assign for each instance of a secure key, a trusted chain of nodes (e.g., a sequence of trusted nodes and KMEs) through the key management network. Paths of each instance of the secure key may be disjoint and each originating KME of the pair of secure keys may be different. For example, a first KME may forward the secure key according to a first chain and a second KME may forward the secure key according to a second chain. A first consuming network device may be co-located with the first KME or remote from the first KME via trusted nodes. A second consuming network device may be co-located with the second KME or remote from the second KME via trusted nodes. The controller device may extend a protocol to retrieve a secure key to also retrieve a cumulative value for the secure key. Each of the first network device and the second network device may perform a cumulative value calculation, and may report the cumulative value to the controller device for validation after retrieving but before applying a secure key. The controller device may report a validation result to the first network device and the second network device. A successful verification for both secure keys may indicate that the secure keys originated from two different KMEs and have traversed different paths through the key management network. The controller device may provide an unsuccessful verification for a root cause analysis and remediation, and may cause the secure keys to be discarded.

Thus, the controller device conserves computing resources, networking resources, and/or the like that would otherwise have been consumed by failing to validate two secure keys that are created by different KMEs, handling network outages caused by a successful attack of a quantum link, handling lost traffic caused by a successful attack of a quantum link, failing to identify and revoke a secure key associated with a compromised trusted node, and/or the like.

FIGS. 1A-1H are diagrams of an example 100 associated with providing QKD key delivery proof of origin and transit. As shown in FIGS. 1A-1H, example 100 includes a controller device, a first physically-secured location (e.g., physically-secured location A), a second physically-secured location (e.g., physically-secured location B), a first intermediate location (e.g., physically-secured location Z), a second intermediate location (e.g., physically-secured location Z1), and a third intermediate location (e.g., physically-secured location Z2). As further shown in FIG. 1A, the first physically-secured location (e.g., physically-secured location A) may include a first network device (e.g., secure application entity (SAE)-A), a first KME (e.g., KME-A), a first QKD device (e.g., QKD-A), and a second QKD device (e.g., QKD-A1). The first network device may connect to the first KME (e.g., via a QKD-API), and the first KME may connect to the first QKD device (e.g., QKD-A) and the second QKD device (e.g., QKD-A1).

The second physically-secured location (e.g., physically-secured location B) may include a second network device (e.g., SAE-B), a second KME (e.g., KME-B), a third QKD device (e.g., QKD-B), and a fourth QKD device (e.g., QKD-B1). The second network device may connect to the second KME (e.g., via a QKD-API), and the second KME may connect to the third QKD device (e.g., QKD-B) and the fourth QKD device (e.g., QKD-B1). The second network device may connect with the first network device via an IPsec or MACsec tunnel. The first intermediate location (e.g., physically-secured location Z) may include a fifth KME (e.g., KME-X) that interconnects with a sixth KME (e.g., KME-Y). The fifth KME may form a quantum channel with the first QKD device (e.g., QKD-A), and the sixth KME may form another quantum channel with the third QKD device (e.g., QKD-B). The second intermediate location (e.g., physically-secured location Z1) may include a seventh KME (e.g., KME-X1) that interconnects with an eighth KME (e.g., KME-Y1). The seventh KME may connect with the second QKD device (e.g., QKD-A1). The third intermediate location (e.g., physically-secured location Z2) may include a ninth KME (e.g., KME-X2) that interconnects with a tenth KME (e.g., KME-Y2). The ninth KME may connect with the fourth QKD device (e.g., QKD-B1), and the tenth KME may connect with the eighth KME (e.g., KME-Y1). The controller device may connect to all of the devices of the key management network. In some implementations, each of the QKD devices and/or each of the KMEs may be a network device. Further details of the controller device, the KMEs, the QKD devices, and the network devices are provided elsewhere herein.

In some implementations, the controller device may enable a consumer of keys (e.g., the second network device SAE-B) to proof properties and provenance including the transit of nodes (e.g., the KMEs of the intermediate locations). The controller device may provide proof of transit to secure key data in quantum networks, such as the key management network of FIG. 1A. The controller device may assign, for each instance of a secure key (e.g., SKa and SKb), a chain of trusted nodes (e.g., the KMEs and the QKD devices) that define a path through the key management network. The paths may be disjoint and each originating KME of the secure key pair may be different. For example, the first KME (e.g., KME-A) may forward a first path according to a definition of a first chain of trusted nodes (e.g., chain-A) and the second KME (e.g., KME-B) may forward a second path according to a definition of a second chain of trusted nodes (e.g., chain-B). In some implementations, the consuming SAE nodes (e.g., the first network device SAE-A and the second network device SAE-B) may be co-located with a KME (e.g., KME-A and KME-B) or with a remote KME via the trusted nodes.

A standard protocol to retrieve the secure keys may be extended to also retrieve a cumulative value for the secure keys. Each SAE may perform a cumulative value calculation. After retrieving, but before applying a secure key, each SAE may report the cumulative value to the controller device for verification. The controller device may perform a validation of the secure keys based on the cumulative values, and may report a validation result back to the SAEs. A successful verification for both secure keys indicates that the secure keys have originated from two different KMEs and have traversed different paths through the key management network. The controller device may process an unsuccessful verification with a root cause analysis and remediation, and may discard the secure keys.

In some implementations, if the controller device determines that a trusted node has been compromised, the controller device may perform a revalidation of all active secure keys to eliminate compromised key information. Alternatively, SAE-A may provide a key identifier and a cumulative value to SAE-B. The controller device may determine whether the cumulative value provided by SAE-A to SAE-B is different than the cumulative value received from KME-B. When the controller device determines that the cumulative value provided by SAE-A to SAE-B is different than the cumulative value received from KME-B, the controller device may determine that both secure keys propagated through different paths.

In some implementations, instead of the SAEs requesting the validation, the adjacent KMEs (e.g., the first KME and the second KME) may request the validation from the controller device. Such implementations may offload protocol overhead to the KMEs and may avoid modifying the APIs between the SAEs and the KMEs. In some implementations, the APIs may be extended to allow SAE-A and SAE-B to request a verification action of a secure key that is in use. This may enable the controller device to revoke secure keys that are compromised (e.g., after detecting a breach in a trusted node, all active secure keys that transited across the trusted node may be revoked). In such implementations, SAE-A may communicate a key identifier and a cumulative value (e.g., but not the secure key), by a separate means, to SAE-B. This may enable SAE-B to report the proof of transit for the secure keys to the controller device, which simplifies the verification process since path information of each path is available in one dataset and requires only one message exchange instead of two.

In some implementations, a mechanism could be used by remote entities to verify that SAE-A and SAE-B are in possession of secure keys derived from QKD as opposed to self-created keys (e.g., in a cloud computing environment). In some implementations, the controller device may utilize nesting to verify provenance of a secure key and to trace the provenance back to a handover point of the secure key.

In some implementations, the controller device may perform a verification without exposing an exact path through the key management network to the SAEs. Unlike in current implementations, a consumer of the secure keys may receive traceable information into which a quantum entity was involved in secure key generation and secure key delivery. Because of this tracing and verification capability, the controller device may ensure that the secure key instances used by SAE-A and SAE-B are disjoint and sourced from different KMEs. The controller device may also prevent the SAEs from being tricked into user made-up secure keys since the provenance for each secure key instance is verified.

Cloud computing environment providers and users may agree on a specific way to share secure keys generated by QKD systems in the cloud computing environment. By adding traceable (non-QKD) gateways under client control to a key delivery mechanism, trust in a provided secure key may be improved. To combine QKD with proof of transit, secure key consumers (e.g., the SAEs) or the KMEs may trigger transit verification for the secure keys. The controller device may determine whether two secure key instances originate from different ingress nodes and traverse non-overlapping intermediate nodes.

Figure 1B:
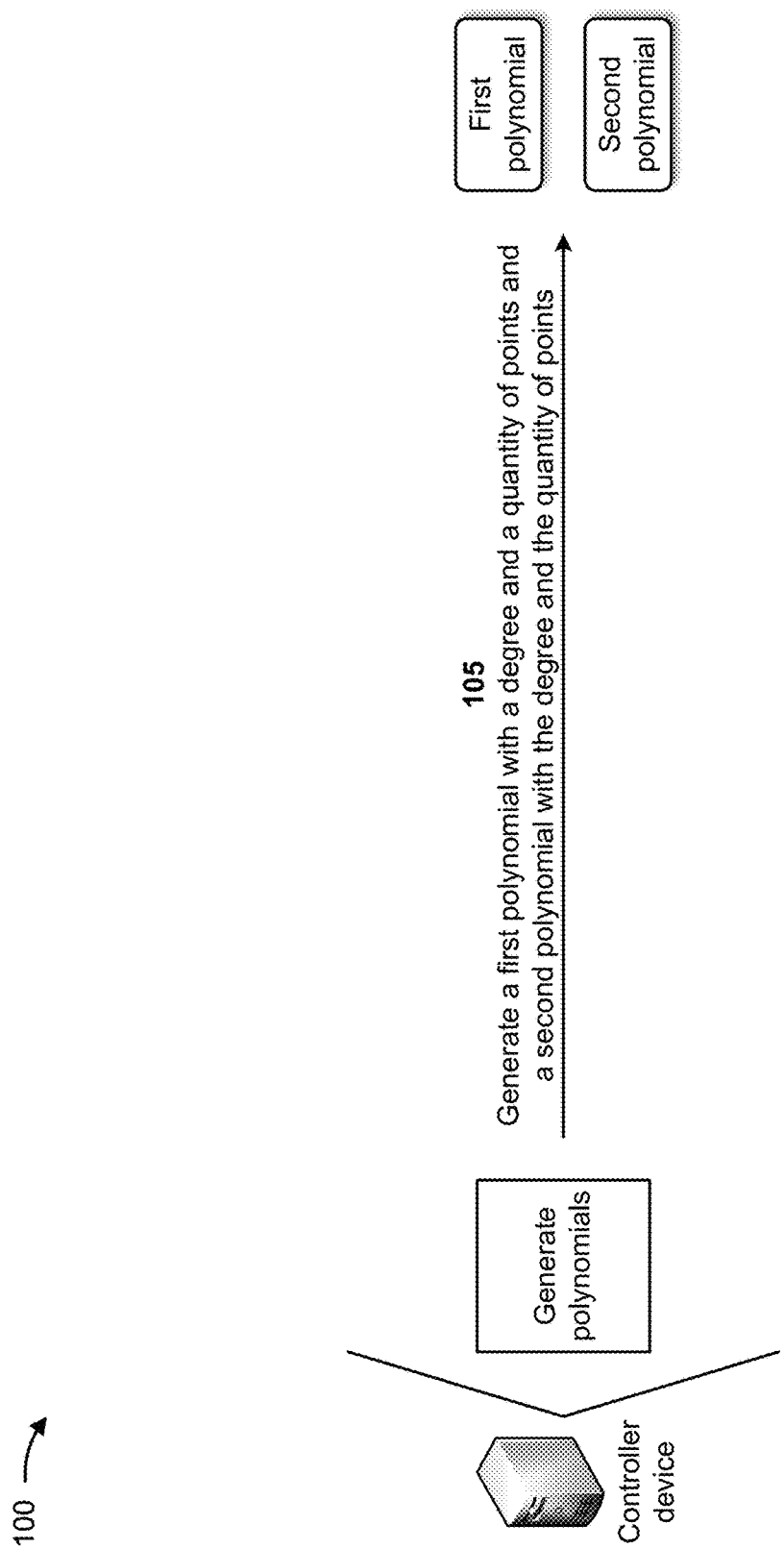

As shown in FIG. 1B, and by reference number 105, the controller device may generate a first polynomial with a degree and a quantity of points and a second polynomial with the degree and the quantity of points. For example, proof of transit may function well if data traverse a pre-defined sequence of trusted nodes. However, for protection and resiliency, two or more paths can be traversed by the data. Thus, the controller device may cause proof of transit to be applied at a split or merge point. For primary and secondary protection, the controller device may generate a first polynomial with a degree K and a quantity of points (e.g., corresponding to k nodes along the primary path) and a second polynomial with a degree of k+1 and the quantity of points (e.g., corresponding to k+1 nodes along the secondary path).

Figure 1C:
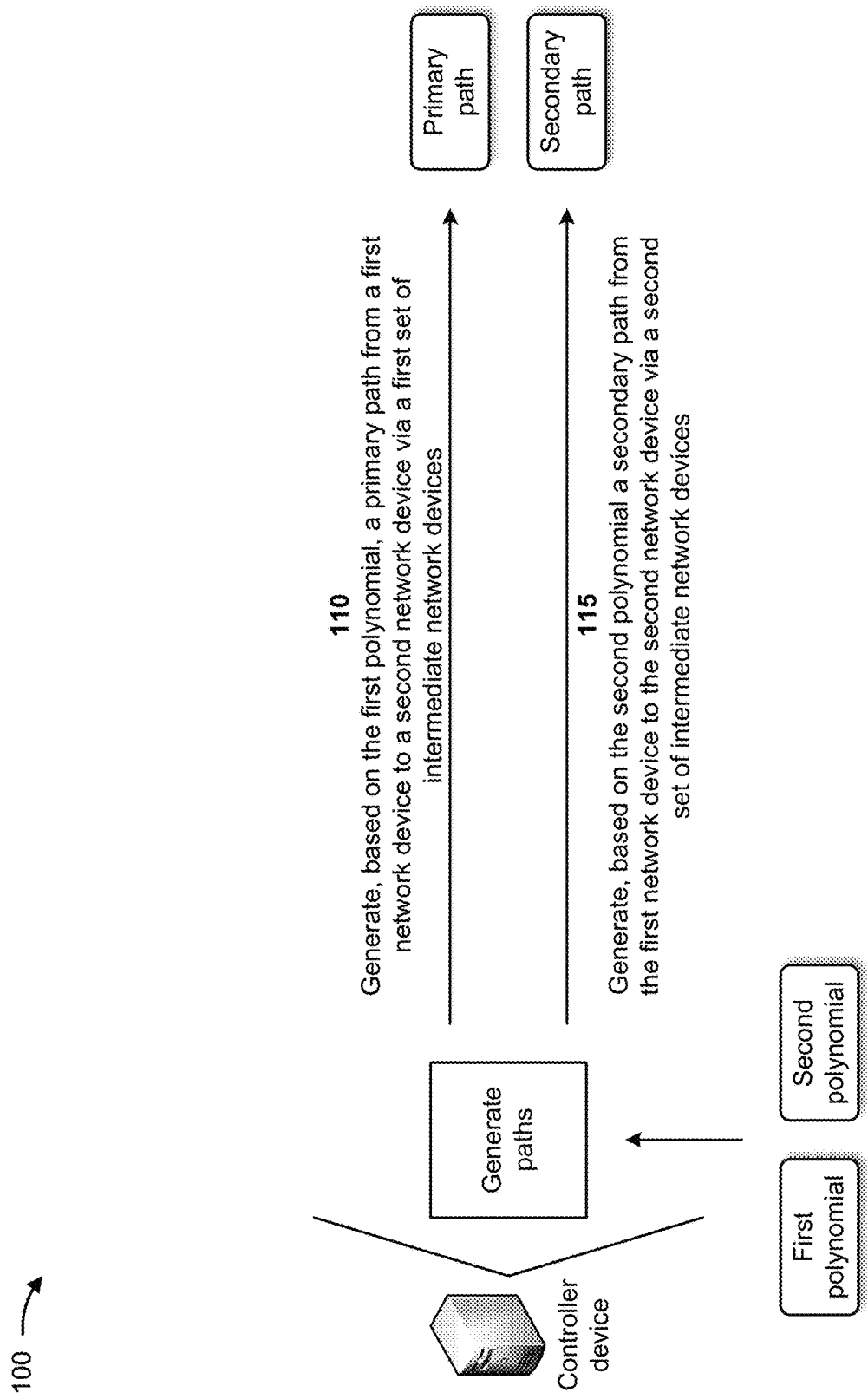

As shown in FIG. 1C, and by reference number 110, the controller device may generate, based on the first polynomial, a primary path from a first network device to a second network device via a first set of intermediate network devices. For example, the controller device may utilize the first polynomial with the degree and the quantity of points to generate a primary path from the first network device (e.g., SAE-A) to the second network device (e.g., SAE-B) via a first set of intermediate network devices. In one example, the primary path may be defined to traverse the following nodes (e.g., network devices): the first KME (e.g., KME-A)→the first QKD device (e.g., QKD-A)→the fifth KME (e.g., KME-X)→the sixth KME (e.g., KME-Y)→the third QKD device (e.g., QKD-B)→the second KME (e.g., KME-B). Thus, the first set of intermediate network devices may include the first KME (e.g., KME-A), the first QKD device (e.g., QKD-A), the fifth KME (e.g., KME-X), the sixth KME (e.g., KME-Y), the third QKD device (e.g., QKD-B), and the second KME (e.g., KME-B).

As further shown in FIG. 1C, and by reference number 115, the controller device may generate, based on the second polynomial, a secondary path from the first network device to the second network device via a second set of intermediate network devices. For example, the controller device may utilize the second polynomial with the degree and the quantity of points to generate a secondary path from the first network device (e.g., SAE-A) to the second network device (e.g., SAE-B) via a second set of intermediate network devices. In one example, the secondary path may be defined to traverse the following nodes (e.g., network devices): the first KME (e.g., KME-A)→the second QKD device (e.g., QKD-A1)→the seventh KME (e.g., KME-X1)→the eighth KME (e.g., KME-Y1)→the tenth KME (e.g., KME-Y2) →the ninth KME (e.g., KME-X2)→fourth QKD device (e.g., QKD-B1)→the second KME (e.g., KME-B). Thus, the second set of intermediate network devices may include the first KME (e.g., KME-A), the second QKD device (e.g., QKD-A1), the seventh KME (e.g., KME-X1), the eighth KME (e.g., KME-Y1), the tenth KME (e.g., KME-Y2), the ninth KME (e.g., KME-X2), the fourth QKD device (e.g., QKD-B1), and the second KME (e.g., KME-B).

Figure 1D:
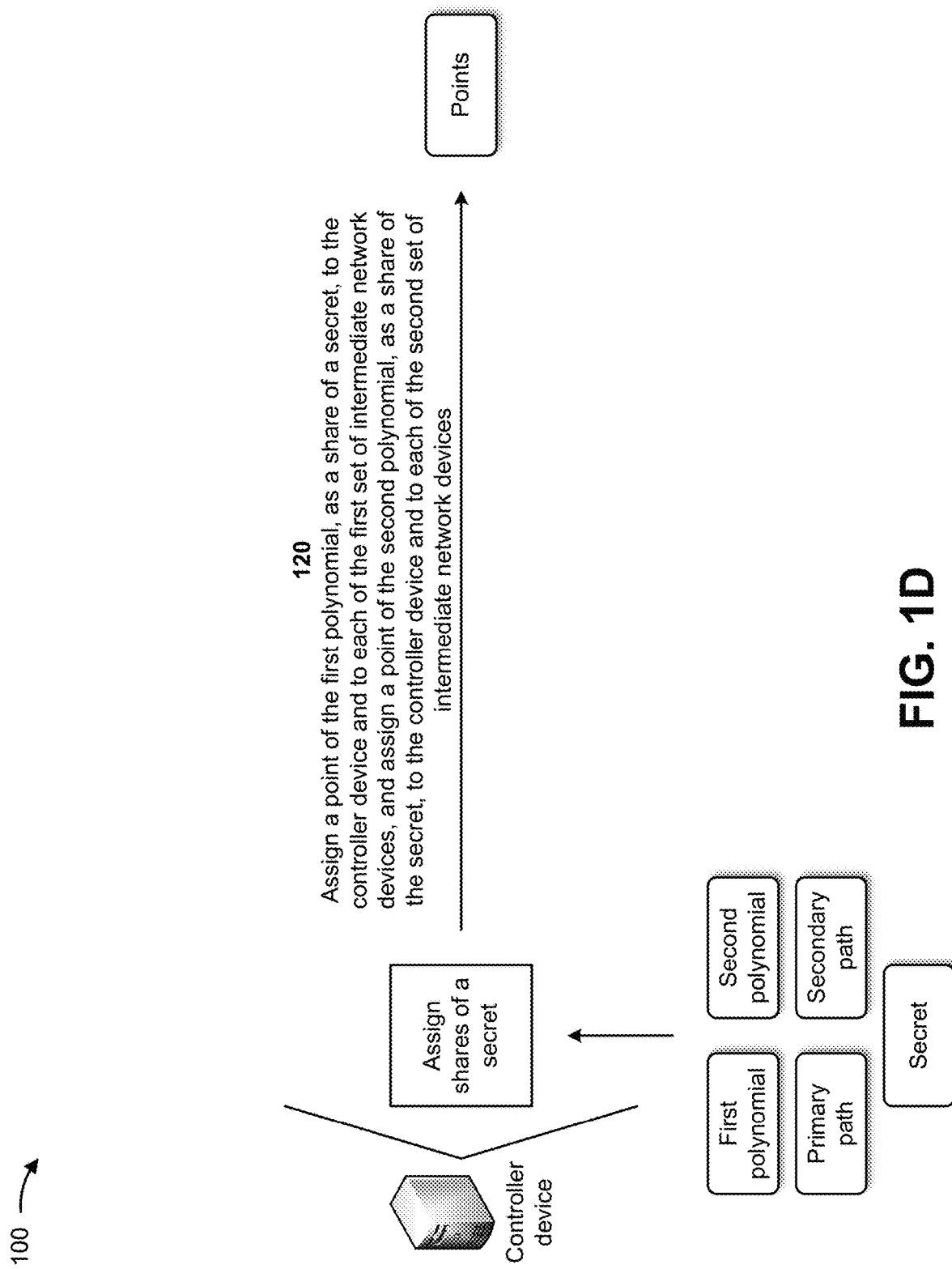

As shown in FIG. 1D, and by reference number 120, the controller device may assign a point of the first polynomial, as a share of a secret, to the controller device and to each of the first set of intermediate network devices, and may assign a point of the second polynomial, as a share of the secret, to the controller device and to each of the second set of intermediate network devices. For example, the controller device may be configured with a secret to be shared with network devices along the primary path and the secondary path. In some implementations, the controller device may assign a point of the first polynomial, as a share of the secret, to the controller device and to each of the first set of intermediate network devices. In one example, the controller device may assign a point of the first polynomial to the first KME (e.g., KME-A), the first QKD device (e.g., QKD-A), the fifth KME (e.g., KME-X), the sixth KME (e.g., KME-Y), the third QKD device (e.g., QKD-B), and the second KME (e.g., KME-B).

In some implementations, the controller device may assign a point of the second polynomial, as a share of the secret, to the controller device and to each of the second set of intermediate network devices. In one example, the controller device may assign a point of the second polynomial to the first KME (e.g., KME-A), the second QKD device (e.g., QKD-A1), the seventh KME (e.g., KME-X1), the eighth KME (e.g., KME-Y1), the tenth KME (e.g., KME-Y2), the ninth KME (e.g., KME-X2), the fourth QKD device (e.g., QKD-B1), and the second KME (e.g., KME-B). After assigning the points of the first polynomial and the second polynomial, the first KME (e.g., KME-A) and the second KME (e.g., KME-B) may be endpoints of two distinct polynomials (e.g., the first polynomial and the second polynomial).

Figure 1E:
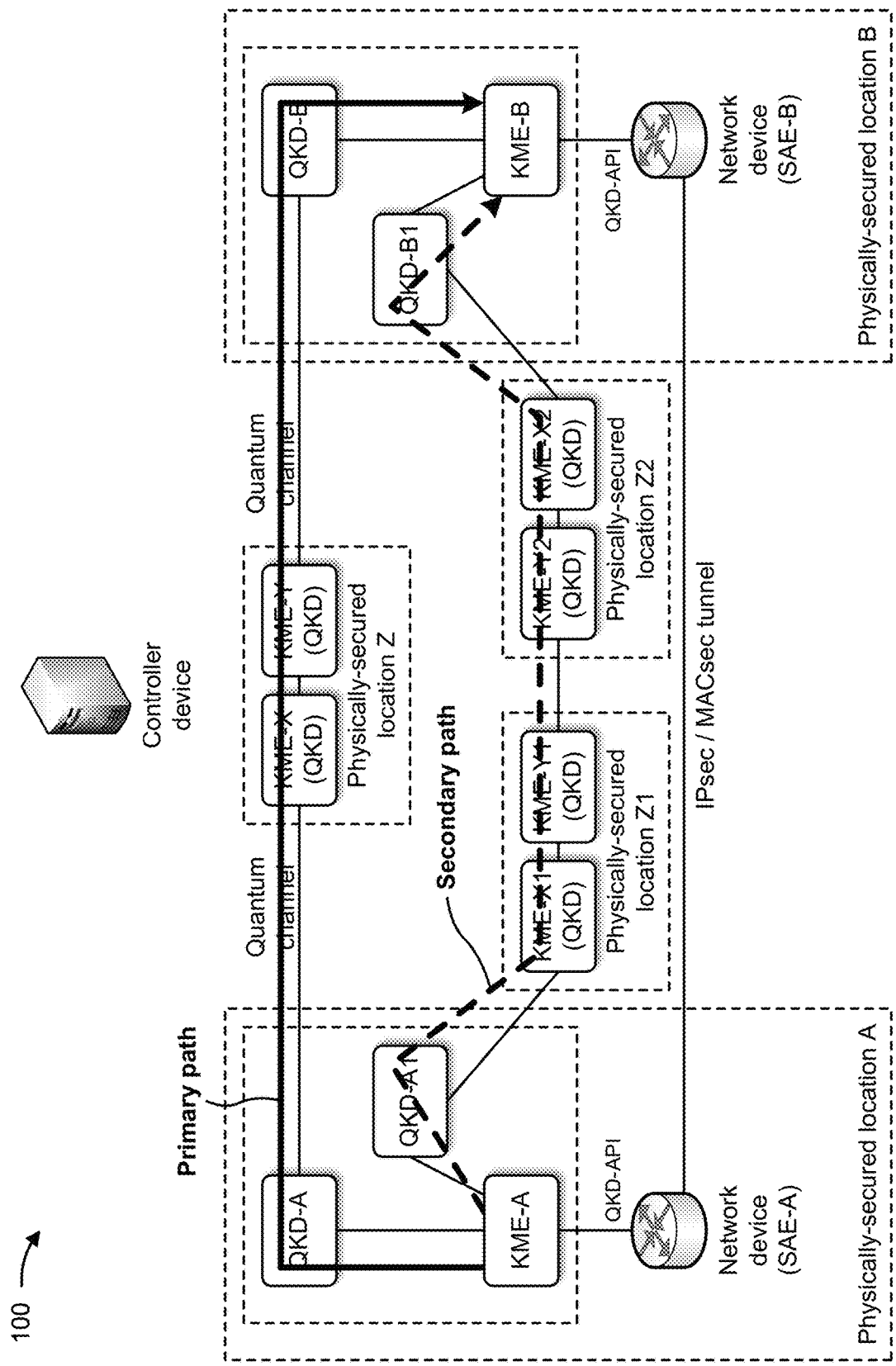

As shown in FIG. 1E, the controller device may cause the primary path to be provided from the first network device to the second network device via the first set of intermediate network devices, and may cause the secondary path to be provided from the first network device to the second network device via the second set of intermediate network devices. For example, the controller device may cause the primary path (e.g., shown by a solid line) to be provided from the first network device (e.g., SAE-A) to the first KME (e.g., KME-A), to the first QKD device (e.g., QKD-A), to the fifth KME (e.g., KME-X), to the sixth KME (e.g., KME-Y), to the third QKD device (e.g., QKD-B), to the second KME (e.g., KME-B), and to the second network device (e.g., SAE-B). In another example, the controller device may cause the secondary path (e.g., shown by a dashed line) to be provided from the first network device (e.g., SAE-A) to the first KME (e.g., KME-A), to the second QKD device (e.g., QKD-A1), to the seventh KME (e.g., KME-X1), to the eighth KME (e.g., KME-Y1), to the tenth KME (e.g., KME-Y2), to the ninth KME (e.g., KME-X2), to the fourth QKD device (e.g., QKD-B1), to the second KME (e.g., KME-B), and to the second network device (e.g., SAE-B).

As shown in FIG. 1F, and by reference number 125, the first network device may generate a random number, based on a third polynomial, and a cumulative value for a packet destined for the second network device. For example, the first network device (e.g., SAE-A) may generate a random number based on a third polynomial (e.g., a constant coefficient of the third polynomial), and may initialize a cumulative value to zero. The first network device may generate a packet destined for the second network device (e.g., SAE-B), and may include the random number and cumulative value within the packet. In some implementations, a first instance of the packet may include a first secure key and a second instance of the packet may include a second secure key.

As further shown in FIG. 1F, and by reference number 130, the first network device may provide the packet via the first KME and the paths (e.g., the primary path and the secondary path). For example, the first network device may provide the first instance of the packet to the second network device, via the first KME (e.g., KME-A) and the trusted nodes of the primary path (e.g., the first QKD device (e.g., QKD-A), the fifth KME (e.g., KME-X), the sixth KME (e.g., KME-Y), the third QKD device (e.g., QKD-B), and the second KME (e.g., KME-B)). The first network device may provide the second instance of the packet to the second network device, via the first KME (e.g., KME-A) and the trusted nodes of the secondary path (e.g., the second QKD device (e.g., QKD-A1), the seventh KME (e.g., KME-X1), the eighth KME (e.g., KME-Y1), the tenth KME (e.g., KME-Y2), the ninth KME (e.g., KME-X2), the fourth QKD device (e.g., QKD-B1), and the second KME (e.g., KME-B)).

As further shown in FIG. 1F, and by reference number 135, the first KME (e.g., KME-A) may retrieve the random number from the packet, may calculate a sum of shares of the first polynomial and the third polynomial, and may update the cumulative value with the sum. For example, as the first instance packet visits each trusted node of the primary path, a trusted node may retrieve the random number from the first instance of the packet and may calculate a sum of shares of the first polynomial and the third polynomial. The trusted node may update the cumulative value of the first instance of the packet with the sum. Thus, the first KME may retrieve the random number from the first instance of the packet and may calculate a sum of shares of the first polynomial and the third polynomial. The first KME may update the cumulative value of the first instance of the packet with the sum.

As further shown in FIG. 1F, and by reference number 140, the first KME may provide the packet with the updated cumulative value to a next hop of the primary path. For example, the first KME may provide the first instance of the packet, with the updated cumulative value, to the next hop of the primary path (e.g., to the first QKD device (e.g., QKD-A)). The first QKD device may retrieve the random number from the first instance of the packet and may calculate a sum of shares of the first polynomial and the third polynomial. The first QKD device may update the cumulative value of the first instance of the packet with the sum. The first QKD device may provide the first instance of the packet, with the updated cumulative value, to a next hop of the primary path. Each hop of the primary path may receive the first instance of the packet, and may retrieve the random number from the first instance of the packet. Each hop of the primary path may calculate a sum of shares of the first polynomial and the third polynomial, and may update the cumulative value with the sum. Each hop of the primary path may provide the first instance of the packet with the updated cumulative value to a next hop of the primary path until the first instance of the packet reaches the second network device.

Figure 1G:
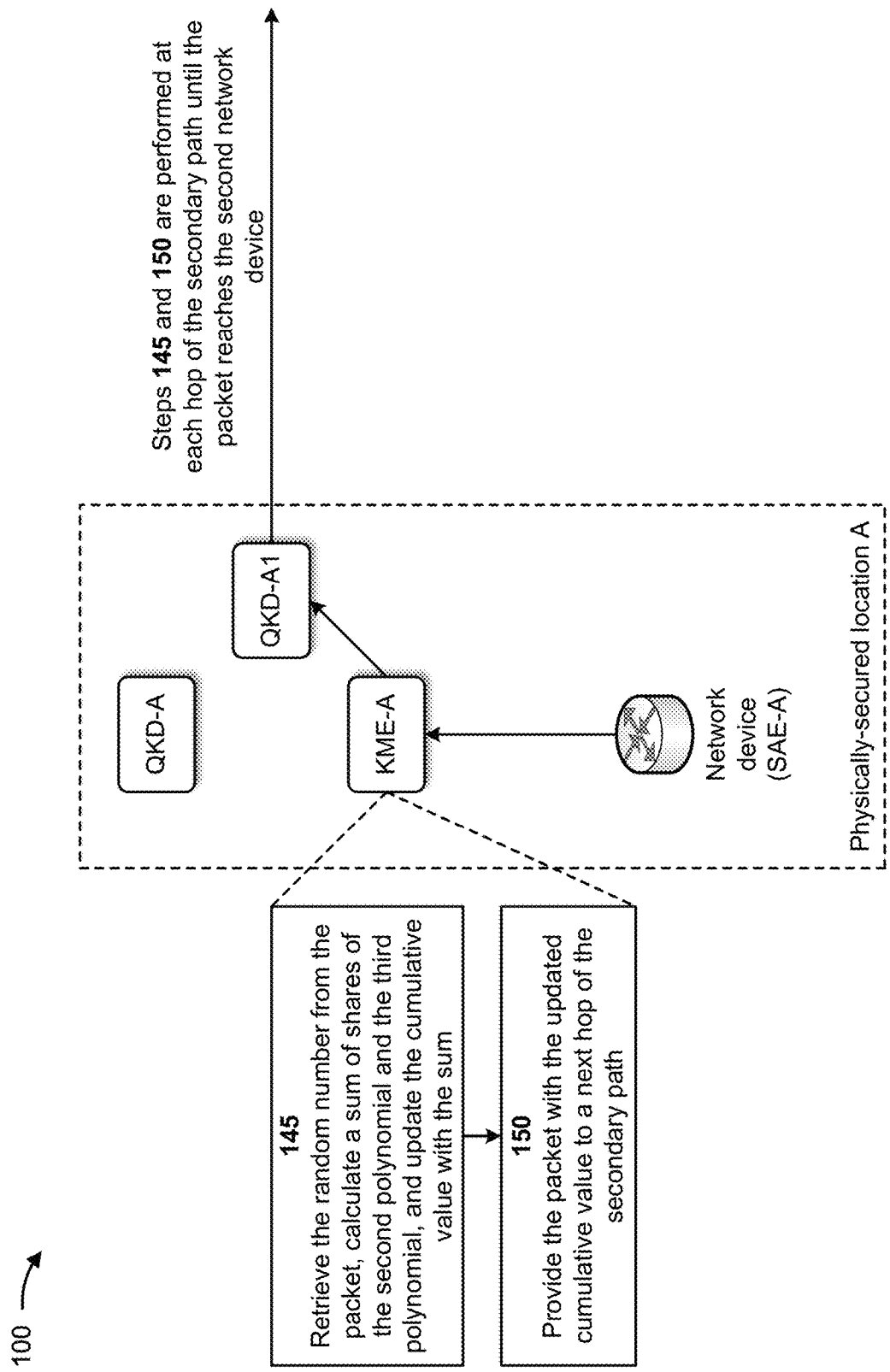

As shown in FIG. 1G, and by reference number 145, the first KME may retrieve the random number from the packet, may calculate a sum of shares of the second polynomial and the third polynomial, and may update the cumulative value with the sum. For example, as the second instance packet visits each trusted node of the secondary path, a trusted node may retrieve the random number from the second instance of the packet and may calculate a sum of shares of the second polynomial and the third polynomial. The trusted node may update the cumulative value of the first instance of the packet with the sum. Thus, the first KME may retrieve the random number from the second instance of the packet and may calculate a sum of shares of the second polynomial and the third polynomial. The first KME may update the cumulative value of the first instance of the packet with the sum.

As further shown in FIG. 1G, and by reference number 150, the first KME may provide the packet with the updated cumulative value to a next hop of the secondary path. For example, the first KME may provide the second instance of the packet, with the updated cumulative value, to the next hop of the secondary path (e.g., to the second QKD device (e.g., QKD-A1)). The second QKD device may retrieve the random number from the second instance of the packet and may calculate a sum of shares of the second polynomial and the third polynomial. The second QKD device may update the cumulative value of the second instance of the packet with the sum. The second QKD device may provide the second instance of the packet, with the updated cumulative value, to a next hop of the secondary path. Each hop of the secondary path may receive the second instance of the packet, and may retrieve the random number from the second instance of the packet. Each hop of the secondary path may calculate a sum of shares of the second polynomial and the third polynomial, and may update the cumulative value with the sum. Each hop of the secondary path may provide the second instance of the packet with the updated cumulative value to a next hop of the secondary path until the second instance of the packet reaches the second network device.

Figure 1H:
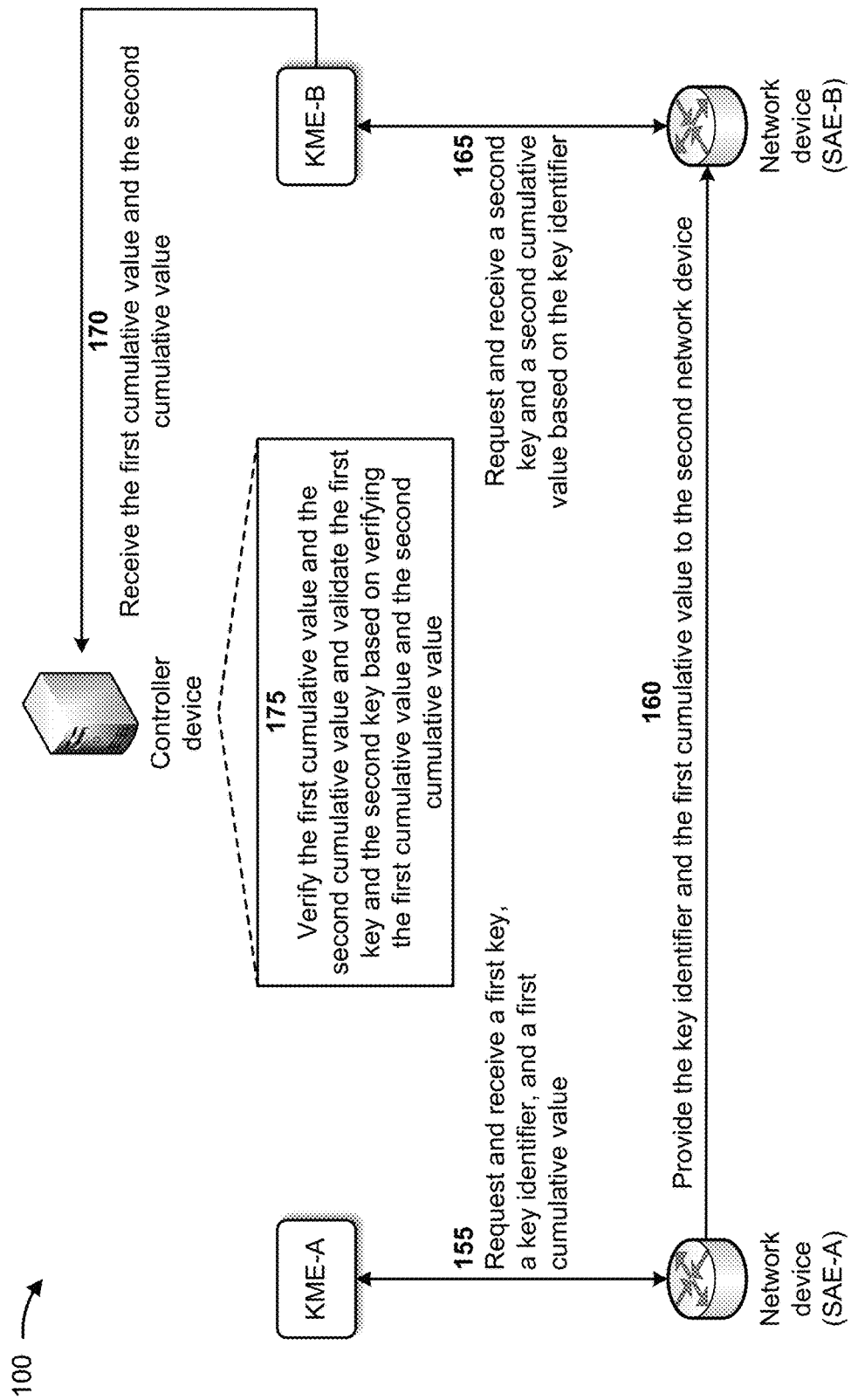

As shown in FIG. 1H, and by reference number 155, the first network device may request and receive, from the first KME, a first key, a key identifier, and a first cumulative value. For example, the first network device may generate a request for a first key (e.g., the first instance of the packet), a key identifier, and a first cumulative value. The first network device may provide the request to the first KME (e.g., KME-A) via the QKD-API. The first KME may provide the first key, the key identifier, and the first cumulative value (e.g., calculated by the first KME) to the first network device based on the request. The first network device may receive the first key, the key identifier, and the first cumulative value from the first KME.

As further shown in FIG. 1H, and by reference number 160, the first network device may provide the key identifier and the first cumulative value to the second network device. For example, when the first network device receives the first key, the key identifier, and the first cumulative value from the first KME, the first network device may provide the key identifier and the first cumulative value to the second network device. The first network device may not provide the first key to the second network device.

As further shown in FIG. 1H, and by reference number 165, the second network device may request and receive, from the second KME, a second key and a second cumulative value based on the key identifier. For example, the second network device may generate a request for a second key (e.g., the second instance of the packet) and a second cumulative value. The second network device may provide the request to the second KME (e.g., KME-B) via the QKD-API. The second KME may provide the second key and the second cumulative value (e.g., calculated by the second KME) to the second network device based on the request. The second network device may receive the second key and the second cumulative value from the second KME.

As further shown in FIG. 1H, and by reference number 170, the controller device may receive the first cumulative value and the second cumulative value. For example, the second network device may provide the first cumulative value to the second KME (e.g., KME-B). After providing the second key and the second cumulative value to the second network device, the second KME may provide the first cumulative value and the second cumulative value to the controller device. The controller device may receive the first cumulative value and the second cumulative value from the second KME.

As further shown in FIG. 1H, and by reference number 175, the controller device may verify the first cumulative value and the second cumulative value and may validate the first key and the second key based on verifying the first cumulative value and the second cumulative value. For example, the controller device may determine whether each of the first cumulative value and the second cumulative value are equivalent to the sum of the secret and the random number, and whether the first cumulative value and the second cumulative value are associated with different paths (e.g., the primary path and the secondary path). In some implementations, the controller device may verify that each of the first cumulative value and the second cumulative value is equivalent to the sum of the secret and the random number, and that the first cumulative value and the second cumulative value are associated with different paths. Alternatively, the controller may fail to verify that each of the first cumulative value and the second cumulative value are equivalent to the sum of the secret and the random number, or that the first cumulative value and the second cumulative value are associated with different paths. The controller device may validate the first key and the second key when the controller device verifies that each of the first cumulative value and the second cumulative value are equivalent to the sum of the secret and the random number, and that the first cumulative value and the second cumulative value are associated with different paths. Alternatively, the controller device may not validate the first key and/or the second key when the controller device fails to verify that each of the first cumulative value and the second cumulative value are equivalent to the sum of the secret and the random number, or that the first cumulative value and the second cumulative value are associated with different paths.

In some implementations, the controller device may revoke the first key and/or the second key based on invalidating the first key and/or the second key. In some implementations, the controller device may verify, based on the first cumulative value and the second cumulative value, that the first network device retrieved the first key from a different source than a source of the second key retrieved by the second network device.

In some implementations, if the second KME (e.g., KME-B) is able to discriminate between the primary path and the secondary path based on a receiving port, a primary port of the second KME may receive the first key via the third QKD device (e.g., QKD-B). The second KME may calculate a sum of shares of the first polynomial and the third polynomial and may update the first cumulative value with the sum. A secondary port of the second KME may receive the second key via the fourth QKD device (e.g., QKD-B1). The second KME may calculate a sum of shares of the second polynomial and the third polynomial and may update the second cumulative value with the sum.

In some implementations, if the second KME is unable to discriminate between the primary path and the secondary path, the second KME may calculate the first cumulative value based on the first polynomial and the third polynomial, and may calculate the second cumulative value based on the second polynomial and the third polynomial. The second KME may provide the first cumulative value and the second cumulative value to the controller device.

In this way, the controller device provides QKD key delivery proof of origin and transit. For example, the controller device may validate or proof properties and provenance, including trusted nodes, for a quantum link. The controller device may assign, for each instance of a secure key, a trusted chain of nodes (e.g., a sequence of trusted nodes and KMEs) through the key management network. Paths of each instance of the secure key may be disjoint and each originating KME of the pair of secure keys may be different. For example, a first KME may forward the secure key according to a first chain and a second KME may forward the secure key according to a second chain. A first consuming network device may be co-located with the first KME or remote from the first KME via trusted nodes. A second consuming network device may be co-located with the second KME or remote from the second KME via trusted nodes. The controller device may extend a protocol to retrieve a secure key to also retrieve a cumulative value for the secure key. Each of the first network device and the second network device may perform a cumulative value calculation, and may report the cumulative value to the controller device for validation after retrieving but before applying a secure key. The controller device may report a validation result to the first network device and the second network device. A successful verification for both secure keys may indicate that the secure keys originated from two different KMEs and have traversed different paths through the key management network. The controller device may provide an unsuccessful verification for a root cause analysis and remediation, and may cause the secure keys to be discarded.

Thus, the controller device conserves computing resources, networking resources, and/or the like that would otherwise have been consumed by failing to validate two secure keys that are created by different KMEs, handling network outages caused by a successful attack of a quantum link, handling lost traffic caused by a successful attack of a quantum link, failing to identify and revoke a secure key associated with a compromised trusted node, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
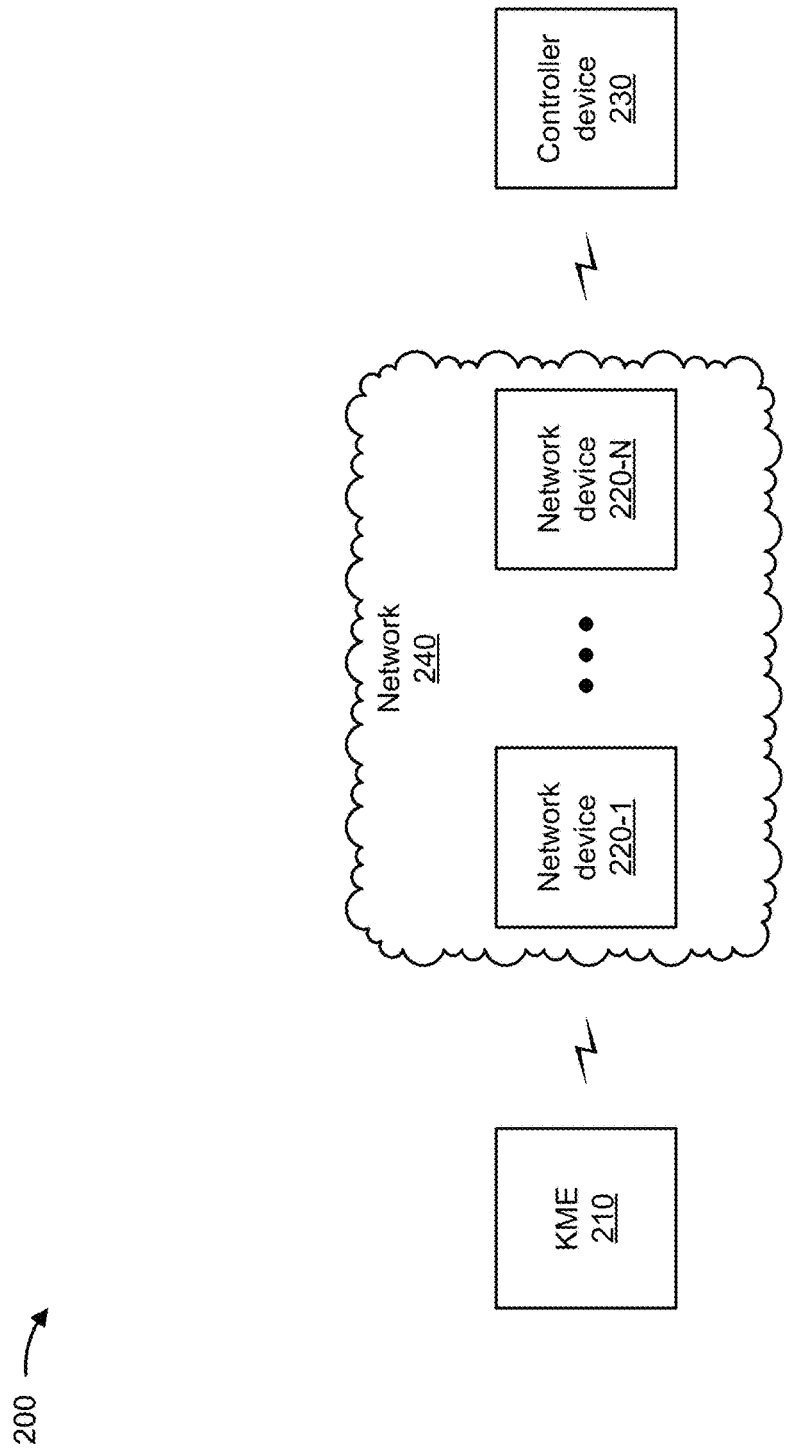
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a KME 210, a group of network devices 220 (shown as network device 220-1 through network device 220-N), a controller device 230, and a network 240. Devices of the environment 200 may interconnect via wired connections, wireless connections, or a combination of wired and wireless connections.

The KME 210 may include one or more devices capable of receiving, generating, storing, processing, providing, and/or routing information, as described elsewhere herein. The KME 210 may include a communication device and/or a computing device. For example, the KME 210 may include a server, such as an application server, a client server, a web server, a database server, a host server, a proxy server, a virtual server (e.g., executing on computing hardware), or a server in a cloud computing system. In some implementations, the KME 210 may include computing hardware used in a cloud computing environment. In some implementations, the KME 210 may be a network device 220 or may be incorporated within a network device 220.

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The controller device 230 may include one or more devices capable of receiving, generating, storing, processing, providing, and/or routing information, as described elsewhere herein. The controller device 230 may include a communication device and/or a computing device. For example, the controller device 230 may include a server, such as an application server, a client server, a web server, a database server, a host server, a proxy server, a virtual server (e.g., executing on computing hardware), or a server in a cloud computing system. In some implementations, the controller device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, and/or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
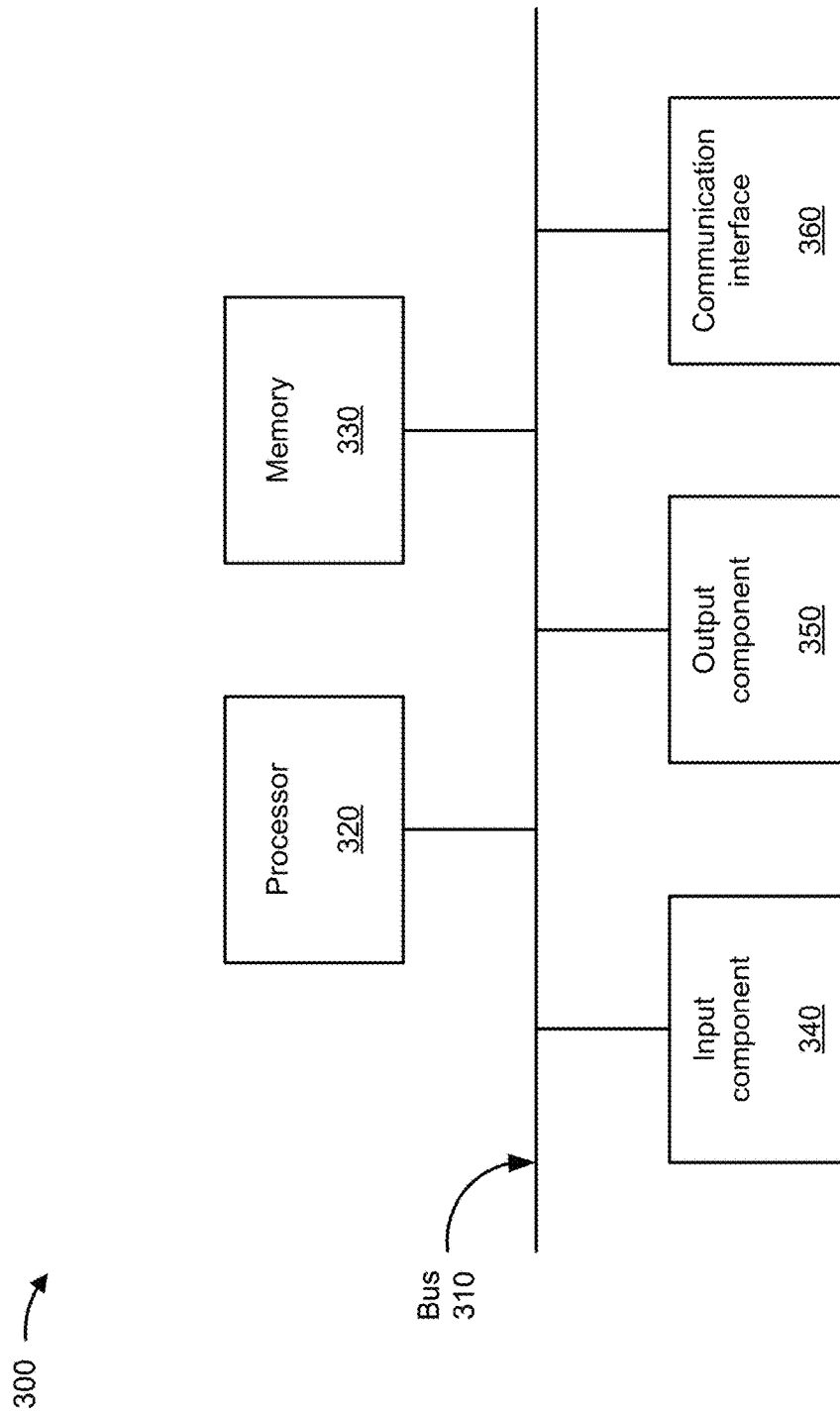
FIGS. 3 and 4 are diagrams of example components of one or more devices of FIG. 2.

FIG. 3 is a diagram of example components of one or more devices of FIG. 2. The example components may be included in a device 300, which may correspond to the KME 210, the network device 220, and/or the controller device 230. In some implementations, the KME 210, the network device 220, and/or the controller device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
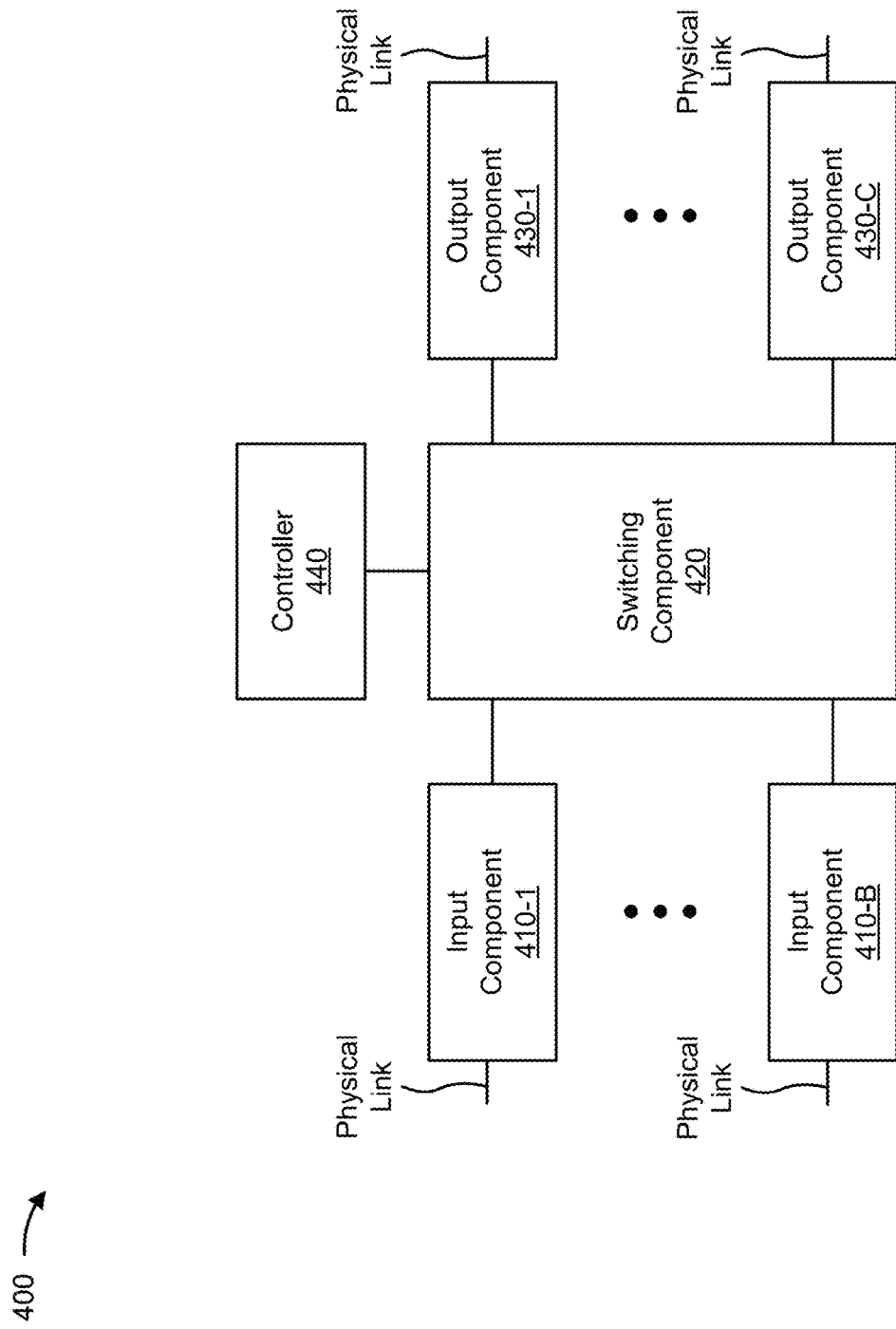

FIG. 4 is a diagram of example components of one or more devices of FIG. 2. The example components may be included in a device 400. The device 400 may correspond to the KME 210 and/or the network device 220. In some implementations, the KME 210 and/or the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for providing QKD key delivery proof of origin and transit. In some implementations, one or more process blocks of FIG. 5 may be performed by a network device (e.g., the network device 220). In some implementations, one or more process blocks of FIG. 5 may be performed by another device or a group of devices separate from or including the network device, such as a KME (e.g., the KME 210) and/or a controller device (e.g., the controller device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include generating a first polynomial with a degree and a quantity of points and a second polynomial with the degree and the quantity of points (block 510). For example, the device may generate a first polynomial with a degree and a quantity of points and a second polynomial with the degree and the quantity of points, as described above.

As further shown in FIG. 5, process 500 may include generating, based on the first polynomial, a primary path from a first network device to a second network device via a first set of intermediate network devices (block 520). For example, the device may generate, based on the first polynomial, a primary path from a first network device to a second network device via a first set of intermediate network devices, as described above. In some implementations, the first network device is a first key management entity at a first end point of a quantum link, and the second network device is a second key management entity at a second end point of the quantum link.

As further shown in FIG. 5, process 500 may include generating, based on the second polynomial, a secondary path from the first network device to the second network device via a second set of intermediate network devices (block 530). For example, the device may generate, based on the second polynomial, a secondary path from the first network device to the second network device via a second set of intermediate network devices, as described above. In some implementations, the first network device is configured to provide a packet to the second network device via the primary path and via the secondary path. In some implementations, the first set of intermediate network devices is configured to calculate a first cumulative value associated with a first key, and the second set of intermediate network devices is configured to calculate a second cumulative value associated with a second key.

In some implementations, the first set of intermediate network devices is configured to calculate a first cumulative value associated with a first key, the second set of intermediate network devices is configured to calculate a second cumulative value associated with a second key, and the first cumulative value is independent of the first key and the second cumulative value is independent of the second key. In some implementations, the primary path is associated with a first quantum link and the secondary path is associated with a second quantum link.

As further shown in FIG. 5, process 500 may include assigning a point of the first polynomial, as a share of a secret, to the device and to each of the first set of intermediate network devices (block 540). For example, the device may assign a point of the first polynomial, as a share of a secret, to the device and to each of the first set of intermediate network devices, as described above. In some implementations, a point of the first polynomial assigned to each of the first set of intermediate network devices corresponds to an intermediate network device of the first set of intermediate network devices provided along the primary path.

As further shown in FIG. 5, process 500 may include assigning a point of the second polynomial, as a share of the secret, to the controller device and to each of the second set of intermediate network devices (block 550). For example, the device may assign a point of the second polynomial, as a share of the secret, to the device and to each of the second set of intermediate network devices, as described above. In some implementations, a point of the second polynomial assigned to each of the second set of intermediate network devices corresponds to an intermediate network device of the second set of intermediate network devices provided along the secondary path.

As further shown in FIG. 5, process 500 may include causing the primary path to be provided from the first network device to the second network device via the first set of intermediate network devices based on assigning the point of the first polynomial (block 560). For example, the device may cause the primary path to be provided from the first network device to the second network device via the first set of intermediate network devices based on assigning the point of the first polynomial, as described above.

As further shown in FIG. 5, process 500 may include causing the secondary path to be provided from the first network device to the second network device via the second set of intermediate network devices based on assigning the point of the second polynomial (block 570). For example, the device may cause the secondary path to be provided from the first network device to the second network device via the second set of intermediate network devices based on assigning the point of the second polynomial, as described above.

In some implementations, process 500 includes receiving the first cumulative value and the second cumulative value from the second network device. In some implementations, process 500 includes determining whether the first cumulative value and the second cumulative value are verified, and selectively validating the first key and the second key based on the first cumulative value and the second cumulative value being verified, or invalidating the first key or the second key based on the first cumulative value and the second cumulative value not being verified. In some implementations, process 500 includes revoking the first key or the second key based on invalidating the first key or the second key. In some implementations, process 500 includes verifying that the first cumulative value and the second cumulative value are associated with different paths, and validating the first key and the second key based on verifying that the first cumulative value and the second cumulative value are associated with different paths.

In some implementations, process 500 includes verifying, based on the first cumulative value and the second cumulative value, that the first network device retrieved the first key from a different source than a source of the second key retrieved by the second network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
generating, by a device, a first polynomial with a degree and a quantity of points and a second polynomial with the degree and the quantity of points;
generating, by the device and based on the first polynomial, a primary path from a first network device to a second network device via a first set of intermediate network devices;
generating, by the device and based on the second polynomial, a secondary path from the first network device to the second network device via a second set of intermediate network devices;
assigning, by the device, a point of the first polynomial, as a share of a secret, to the device and to each of the first set of intermediate network devices;
assigning, by the device, a point of the second polynomial, as a share of the secret, to the device and to each of the second set of intermediate network devices;
causing, by the device, the primary path to be provided from the first network device to the second network device via the first set of intermediate network devices based on assigning the point of the first polynomial; and
causing, by the device, the secondary path to be provided from the first network device to the second network device via the second set of intermediate network devices based on assigning the point of the second polynomial.

2. The method of claim 1, wherein the first network device is configured to provide a packet to the second network device via the primary path and via the secondary path.

3. The method of claim 1, wherein the first set of intermediate network devices is configured to calculate a first cumulative value associated with a first key, and
wherein the second set of intermediate network devices is configured to calculate a second cumulative value associated with a second key.

4. The method of claim 3, further comprising:
receiving the first cumulative value and the second cumulative value from the second network device.

5. The method of claim 4, further comprising:
determining whether the first cumulative value and the second cumulative value are verified; and
selectively:
validating the first key and the second key based on the first cumulative value and the second cumulative value being verified, or
invalidating the first key or the second key based on the first cumulative value and the second cumulative value not being verified.

6. The method of claim 5, further comprising:
revoking the first key or the second key based on invalidating the first key or the second key.

7. The method of claim 4, further comprising:
verifying that the first cumulative value and the second cumulative value are associated with different paths; and
validating the first key and the second key based on verifying that the first cumulative value and the second cumulative value are associated with different paths.

8. A device, comprising:
one or more memories; and
one or more processors to:
generate a first polynomial with a degree and a quantity of points and a second polynomial with the degree and the quantity of points;
generate, based on the first polynomial, a primary path from a first network device to a second network device via a first set of intermediate network devices;
generate, based on the second polynomial, a secondary path from the first network device to the second network device via a second set of intermediate network devices,
wherein the first network device is configured to provide a packet to the second network device via the primary path and via the secondary path;
assign a point of the first polynomial, as a share of a secret, to the device and to each of the first set of intermediate network devices;
assign a point of the second polynomial, as a share of the secret, to the device and to each of the second set of intermediate network devices;
cause the primary path to be provided from the first network device to the second network device via the first set of intermediate network devices based on assigning the point of the first polynomial; and
cause the secondary path to be provided from the first network device to the second network device via the second set of intermediate network devices based on assigning the point of the second polynomial.

9. The device of claim 8, wherein the first set of intermediate network devices is configured to calculate a first cumulative value associated with a first key,
wherein the second set of intermediate network devices is configured to calculate a second cumulative value associated with a second key, and
wherein the first cumulative value is independent of the first key and the second cumulative value is independent of the second key.

10. The device of claim 9, wherein the one or more processors are further configured to:
verify, based on the first cumulative value and the second cumulative value, that the first network device retrieved the first key from a different source than a source of the second key retrieved by the second network device.

11. The device of claim 8, wherein a point of the first polynomial assigned to each of the first set of intermediate network devices corresponds to an intermediate network device of the first set of intermediate network devices provided along the primary path.

12. The device of claim 8, wherein a point of the second polynomial assigned to each of the second set of intermediate network devices corresponds to an intermediate network device of the second set of intermediate network devices provided along the secondary path.

13. The device of claim 8, wherein the first network device is a first key management entity at a first end point of a quantum link, and
wherein the second network device is a second key management entity at a second end point of the quantum link.

14. The device of claim 8, wherein the primary path is associated with a first quantum link and the secondary path is associated with a second quantum link.

15. A non-transitory computer-readable medium storing a set of instructions, the set of instructions comprising:
one or more instructions that, when executed by one or more processors of a device, cause the device to:
generate a first polynomial with a degree and a quantity of points and a second polynomial with the degree and the quantity of points;
generate, based on the first polynomial, a primary path from a first network device to a second network device via a first set of intermediate network devices;
generate, based on the second polynomial, a secondary path from the first network device to the second network device via a second set of intermediate network devices,
wherein the primary path is associated with a first quantum link and the secondary path is associated with a second quantum link;
assign a point of the first polynomial, as a share of a secret, to the device and to each of the first set of intermediate network devices;
assign a point of the second polynomial, as a share of the secret, to the device and to each of the second set of intermediate network devices;
cause the primary path to be provided from the first network device to the second network device via the first set of intermediate network devices based on assigning the point of the first polynomial; and
cause the secondary path to be provided from the first network device to the second network device via the second set of intermediate network devices based on assigning the point of the second polynomial.

16. The non-transitory computer-readable medium of claim 15, wherein the first set of intermediate network devices is configured to calculate a first cumulative value associated with a first key, and
wherein the second set of intermediate network devices is configured to calculate a second cumulative value associated with a second key.

17. The non-transitory computer-readable medium of claim 16, wherein the one or more instructions further cause the device to:
receive the first cumulative value and the second cumulative value from the second network device.

18. The non-transitory computer-readable medium of claim 17, wherein the one or more instructions further cause the device to:
determine whether the first cumulative value and the second cumulative value are verified; and
selectively:
validate the first key and the second key based on the first cumulative value and the second cumulative value being verified, or
invalidate the first key or the second key based on the first cumulative value and the second cumulative value not being verified.

19. The non-transitory computer-readable medium of claim 18, wherein the one or more instructions further cause the device to:
revoke the first key or the second key based on invalidating the first key or the second key.

20. The non-transitory computer-readable medium of claim 17, wherein the one or more instructions further cause the device to:
verify that the first cumulative value and the second cumulative value are associated with different paths; and
validate the first key and the second key based on verifying that the first cumulative value and the second cumulative value are associated with different paths.

* * * * *